(12) United States Patent
Matsumoto

(10) Patent No.: US 11,945,727 B2
(45) Date of Patent: Apr. 2, 2024

(54) ZIRCONIA-BASED POROUS BODY

(71) Applicant: DAIICHI KIGENSO KAGAKU KOGYO CO., LTD., Osaka (JP)

(72) Inventor: Kazuya Matsumoto, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 556 days.

(21) Appl. No.: 17/311,648

(22) PCT Filed: Mar. 13, 2020

(86) PCT No.: PCT/JP2020/011191
§ 371 (c)(1),
(2) Date: Jun. 7, 2021

(87) PCT Pub. No.: WO2020/195973
PCT Pub. Date: Oct. 1, 2020

(65) Prior Publication Data
US 2022/0106195 A1    Apr. 7, 2022

(30) Foreign Application Priority Data

Mar. 28, 2019  (JP) ................................ 2019-063853

(51) Int. Cl.
*C01G 25/00* (2006.01)

(52) U.S. Cl.
CPC ........ *C01G 25/006* (2013.01); *C01P 2006/12* (2013.01); *C01P 2006/14* (2013.01); *C01P 2006/16* (2013.01)

(58) Field of Classification Search
CPC ... C01G 25/02; C01G 25/006; C01P 2006/12; C01P 2006/14; C01P 2006/16
See application file for complete search history.

(56) References Cited

U.S. PATENT DOCUMENTS

| | | | |
|---|---|---|---|
| 2006/0018822 A1* | 1/2006 | Okamoto | C04B 35/486 423/608 |
| 2008/0050593 A1* | 2/2008 | Okamoto | C01G 25/006 428/402 |

(Continued)

FOREIGN PATENT DOCUMENTS

| | | |
|---|---|---|
| CN | 104602809 A | 5/2015 |
| JP | 2006-036576 A | 2/2006 |

(Continued)

OTHER PUBLICATIONS

Office Action issued in CN 202080024888.6; mailed by the State Intellectual Property Office of People's Republic of China dated Nov. 18, 2022.

(Continued)

*Primary Examiner* — Richard M Rump
(74) *Attorney, Agent, or Firm* — Studebaker & Brackett PC

(57) ABSTRACT

The purpose of the present invention is to provide a zirconia-based porous body which can be pulverized in a relatively short time and in which performance deterioration caused by pulverization is suppressed. The present invention pertains to a zirconia-based porous body in which the total pore volume is at least 1.0 ml/g, the pore volume of pores having a diameter of 20-100 nm (exclusive of 100) is at most 0.3 ml/g, and the pore volume of pores having a diameter of 100-1000 nm is at least 0.5 ml/g.

15 Claims, 3 Drawing Sheets

(56) References Cited

U.S. PATENT DOCUMENTS

2009/0258781 A1\* 10/2009 Maruki ................ C01G 25/006
                                                                            428/221
2015/0266004 A1     9/2015 Kumatani et al.
2018/0304235 A1\* 10/2018 Harris .................... B01J 37/031

FOREIGN PATENT DOCUMENTS

| JP | 2008-081392 A | 4/2008 |
| JP | 2009-249275 A | 10/2009 |

OTHER PUBLICATIONS

International Search Report issued in PCT/JP2020/011191; dated Apr. 21, 2020.

\* cited by examiner

ZIRCONIA-BASED POROUS BODY

TECHNICAL FIELD

The present invention relates to a zirconia-based porous body.

BACKGROUND ART

Exhaust gas discharged from internal combustion engines of automobiles and the like, or combustion engines such as boilers contains hazardous substances such as carbon monoxide (CO), hydrocarbon (HC), and nitrogen oxide (NOx) which cause air pollution and the like. Efficient purification of these hazardous substances is an important issue from the viewpoint of preventing environmental contamination and the like. Exhaust gas purification techniques which can purify the three hazardous substances at the same time have been actively studied.

Recent tightening of exhaust gas regulations provides advanced development of a wall-flow type honeycomb structure. The wall-flow type honeycomb structure includes a filter collecting particulate matters (for example, gasoline particulate filter (GPF) and diesel particulate filter (DPF)) and having ternary catalytic performance for purifying carbon monoxide, hydrocarbon, and nitrogen oxide. In the wall-flow type honeycomb structure, a catalyst material is disposed on or inside a partition wall.

Patent Document 1 discloses a zirconia-based porous body having peaks in pore diameters of 8 to 20 nm and 30 to 100 nm in a pore distribution based on the BJH method and a total pore volume of 0.4 cc/g or more, and a zirconia-based porous body having a peak in a pore diameter of 20 to 110 nm in a pore distribution based on the BJH method and a total pore volume of 0.4 cc/g or more.

Patent Document 2 discloses a zirconia-based porous body which has a total pore volume of at least 0.75 ml/g after a heat treatment at 1000° C. for 3 hours and in which the total volume of pores having a diameter of 10 to 100 nm after the heat treatment at 1000° C. for 3 hours is at least 30% of the total pore volume.

Patent Document 3 discloses a cerium-zirconium based composite oxide having a total pore volume of at least 0.4 ml/g, the volume of pores having a diameter of 10 nm to 100 nm being 0.25 ml/g or more, the volume of pores having a diameter of 100 nm to 10 µm being 0.2 ml/g or less.

PRIOR ART DOCUMENTS

Patent Documents

Patent Document 1: JP-A-2006-036576
Patent Document 2: JP-A-2008-081392
Patent Document 3: JP-A-2009-249275

DISCLOSURE OF THE INVENTION

Problems to be Solved by the Invention

The catalyst material is used in a state where the honeycomb structure is coated with the catalyst material in a slurry state. Here, in order to dispose the catalyst material inside the partition wall of the honeycomb structure, it is necessary to form the catalyst material into small particles which enter points of the partition wall. Therefore, in order to coat the honeycomb structure with the catalyst material, it is necessary to wet-pulverize the catalyst material until the catalyst material has a suitable particle size. However, conventionally, there has been room for improvement in that it takes a relatively long time to pulverize the catalyst material until the catalyst material has a particle size suitable for coating.

The catalyst material has high performance such as a high specific surface area before pulverization, but when the catalyst material is finely pulverized by a strong pulverizing force and the like until the catalyst material has a particle size suitable for coating, the catalytic performance of the catalyst material is deteriorated, which disadvantageously causes deteriorated exhaust gas purification performance. In particular, the material for GPF is pulverized to a particle size smaller than that of a conventional catalyst material, so that the catalyst performance of the material is significantly deteriorated.

The present invention has been made in view of the above-described problems, and an object of the present invention is to provide a zirconia-based porous body which can be pulverized in a relatively short time and in which performance deterioration caused by pulverization is suppressed.

Means for Solving the Problems

The present inventor has diligently studied a zirconia-based porous body. As a result, the present inventor has found that a zirconia-based porous body can be provided, which contains a large number of pores having a relatively large diameter and can be pulverized in a relatively short time, and in which performance deterioration caused by pulverization is suppressed, and has completed the present invention.

That is, a zirconia-based porous body according to the present invention having a total pore volume of 1.0 ml/g or more in a pore distribution based on a mercury intrusion method, wherein a pore volume of pores having a diameter of 20 nm or more and less than 100 nm is 0.3 ml/g or less, and a pore volume of pores having a diameter of 100 nm or more and 1000 nm or less is 0.5 ml/g or more.

Conventionally, when a zirconia-based porous body contains a large number of pores having a large diameter, the entire specific surface area of the zirconia-based porous body becomes small. This has provided no idea of causing the zirconia-based porous body to contain a large number of pores having a large diameter. For example, Patent Documents 1 to 3 do not have such an idea. Meanwhile, as a result of diligent studies, the present inventor has found that even when pores having a relatively large diameter are increased, the zirconia-based porous body is easily pulverized, and has a slightly small specific surface area before pulverization, but the specific surface area of the zirconia-based porous body after pulverization is not significantly inferior to that of a zirconia-based porous body which does not contain a large number of pores having a large diameter.

According to the above configuration, the pore volume of the pores having a relatively large diameter of 100 nm or more and 1000 nm or less is 0.5 ml/g or more, whereby the zirconia-based porous body can be pulverized in a relatively short time. The pore volume of the pores having a relatively large diameter of 100 nm or more and 1000 nm or less is 0.5 ml/g or more, whereby performance deterioration caused by pulverization is suppressed. This is also clear from Examples.

The total pore volume is 1.0 ml/g or more, whereby the zirconia-based porous body has excellent catalyst performance when used as a catalyst material.

In the above configuration, it is preferable that the zirconia-based porous body contains one or more crystal phases selected from the group consisting of a monoclinic crystal phase (1), a tetragonal crystal phase (2), and a cubic crystal phase other than a pyrochlore phase and a κ phase (3).

When the zirconia-based porous body contains one or more crystal phases selected from the group consisting of a monoclinic crystal phase (1), a tetragonal crystal phase (2), and a cubic crystal phase other than a pyrochlore phase and a K phase (3), the zirconia-based porous body is likely to have a high pore volume (total pore volume) and a high specific surface area.

In the above configuration, it is preferable that the total pore volume is 1.2 ml/g or more; and the pore volume of the pores having a diameter of 100 nm or more and 1000 nm or less is 0.7 ml/g or more.

In the above configuration, it is preferable that the total pore volume is 3.0 ml/g or less; and the pore volume of the pores having a diameter of 100 nm or more and 1000 nm or less is 1.7 ml/g or less.

In the above configuration, it is preferable that the zirconia-based porous body has a total pore volume of 0.3 ml/g or more in a pore distribution based on a mercury intrusion method after a heat treatment at 1100° C. for 3 hours; a pore volume of pores having a diameter of 20 nm or more and less than 100 nm is 0.1 ml/g or less after a heat treatment at 1100° C. for 3 hours; and a pore volume of pores having a diameter of 100 nm or more and 1000 nm or less is 0.2 ml/g or more after a heat treatment at 1100° C. for 3 hours.

When the zirconia-based porous body has the total pore volume of 0.3 ml/g or more after the heat treatment at 1100° C. for 3 hours, and the pore volume of the pores having a diameter of 100 nm or more and 1000 nm or less after the heat treatment at 1100° C. for 3 hours is 0.2 ml/g or more, the zirconia-based porous body can be said to have a high pore volume even after the heat treatment. Therefore, the zirconia-based porous body can be said to have high catalytic performance even after being exposed to a high temperature.

In the above configuration, it is preferable that the total pore volume after the heat treatment at 1100° C. for 3 hours is 2.0 ml/g or less; and the pore volume of the pores having a diameter of 100 nm or more and 1000 nm or less after the heat treatment at 1100° C. for 3 hours is 1.6 ml/g or less.

In the above configuration, it is preferable that the zirconia-based porous body has a specific surface area of 30 $m^2$/g or more and 150 $m^2$/g or less.

When the specific surface area is 30 $m^2$/g or more and 150 $m^2$/g or less, the zirconia-based porous body can be said to have a relatively high specific surface area in a state before pulverization.

In the above configuration, it is preferable that the zirconia-based porous body has a specific surface area of 40 $m^2$/g or more and 140 $m^2$/g or less.

In the above configuration, it is preferable that the zirconia-based porous body has a specific surface area of 20 $m^2$/g or more after a heat treatment at 1000° C. for 3 hours.

When the zirconia-based porous body has a specific surface area of 20 $m^2$/g or more after the heat treatment at 1000° C. for 3 hours, the zirconia-based porous body can be said to have a high specific surface area even after the heat treatment. Therefore, the zirconia-based porous body can be said to have high catalytic performance even after being exposed to a high temperature.

In the above configuration, it is preferable that the zirconia-based porous body has a specific surface area of 100 $m^2$/g or less after the heat treatment at 1000° C. for 3 hours.

In the above configuration, it is preferable that when a specific surface area after a heat treatment at 1100° C. for 3 hours is taken as A, and a specific surface area after 100 g of the zirconia-based porous body is dispersed in 250 g of ion-exchanged water, and a pH of the dispersed product is adjusted to 4.0 with nitric acid, followed by wet-pulverizing under the following wet pulverization conditions until a particle size $D_{50}$ becomes 1 μm or less, drying, and performing a heat treatment at 1100° C. for 3 hours is taken as B, a specific surface area maintenance rate represented by the following formula 1 is 80% or more:

<wet pulverization conditions>
pulverizer: planetary ball mill
$ZrO_2$ pot: 500 cc
$ZrO_2$ beads (φ 2 mm): 900 g
number of rotations: 400 rpm (specific surface area maintenance rate)=[(specific surface area $B$)/(specific surface area $A$)]×100 (%)     <Formula 1>

When the specific surface area maintenance rate is 80% or more, a change in the specific surface area before and after pulverization can be said to be small. Therefore, it can be said that the catalyst performance is not significantly reduced by pulverization. The wet pulverization conditions are based on the assumption of wet pulverization which will be generally performed, and are conditions for quantitatively evaluating the amount of the change in the specific surface area before and after pulverization. It is not necessary to pulverize the zirconia-based porous body under the wet pulverization conditions when actually pulverizing the zirconia-based porous body.

In the above structure, it is preferable that the zirconia-based porous body contains 1 mass % or more and 60 mass % or less of one or more oxides selected from rare earth elements.

When the zirconia-based porous body contains 1 mass % or more and 60 mass % or less of one or more oxides selected from rare earth elements, the thermal stability of the specific surface area can be improved. That is, the amount of the change in the specific surface area can be reduced before and after exposure to a high temperature, whereby the catalytic performance can be prevented from being significantly reduced.

In the above composition, it is preferable that the zirconia-based porous body contains 1 mass % or more and 50 mass % or less of the one or more oxides selected from rare earth elements.

In the above structure, it is preferable that the zirconia-based porous body contains 1 mass % or more and 60 mass % or less of one or more oxides selected from the group consisting of lanthanum oxide, cerium oxide, neodymium oxide, praseodymium oxide, and yttrium oxide.

When the zirconia-based porous body contains 1 mass % or more and 60 mass % or less of one or more oxides selected from the group consisting of lanthanum oxide, cerium oxide, neodymium oxide, praseodymium oxide, and yttrium oxide, the thermal stability of the specific surface area can be further improved. That is, the amount of the change in the specific surface area can be further reduced before and after exposure to a high temperature, whereby the catalytic performance can be prevented from being significantly reduced.

In the above configuration, the zirconia-based porous body may contain 0.1 mass % or more and 30 mass % or less of one or more oxides selected from the group consisting of transition metal elements other than rare earth elements, aluminum, and silicon.

When the zirconia-based porous body contains 0.1 mass % or more and 30 mass % or less of one or more oxides selected from the group consisting of transition metal elements other than rare earth elements, aluminum, and silicon, the thermal stability of the specific surface area can be further improved. That is, the amount of the change in the specific surface area can be further reduced before and after exposure to a high temperature, whereby the catalytic performance can be prevented from being significantly reduced.

A method for producing a zirconia-based porous body according to the present invention is a method for producing the above-described zirconia-based porous body. The method includes: a step A of adding a sulfating agent to a zirconium salt solution to form basic zirconium sulfate; a step B of neutralizing the basic zirconium sulfate to form zirconium hydroxide; and a step C of subjecting the zirconium hydroxide to a heat treatment to obtain a zirconia-based porous body. The step A is a step of holding the zirconium salt solution under conditions of a temperature of 100° C. or higher and 200° C. or lower and a pressure of $1.0 \times 10^5$ Pa or higher and $1.5 \times 10^6$ Pa or lower for 10 hours or more and 100 hours or less, and then adding the sulfating agent to the zirconium salt solution.

Effect of the Invention

The present invention can provide a zirconia-based porous body which can be pulverized in a relatively short time and in which performance deterioration caused by pulverization is suppressed.

MODE FOR CARRYING OUT THE INVENTION

Figure 1:
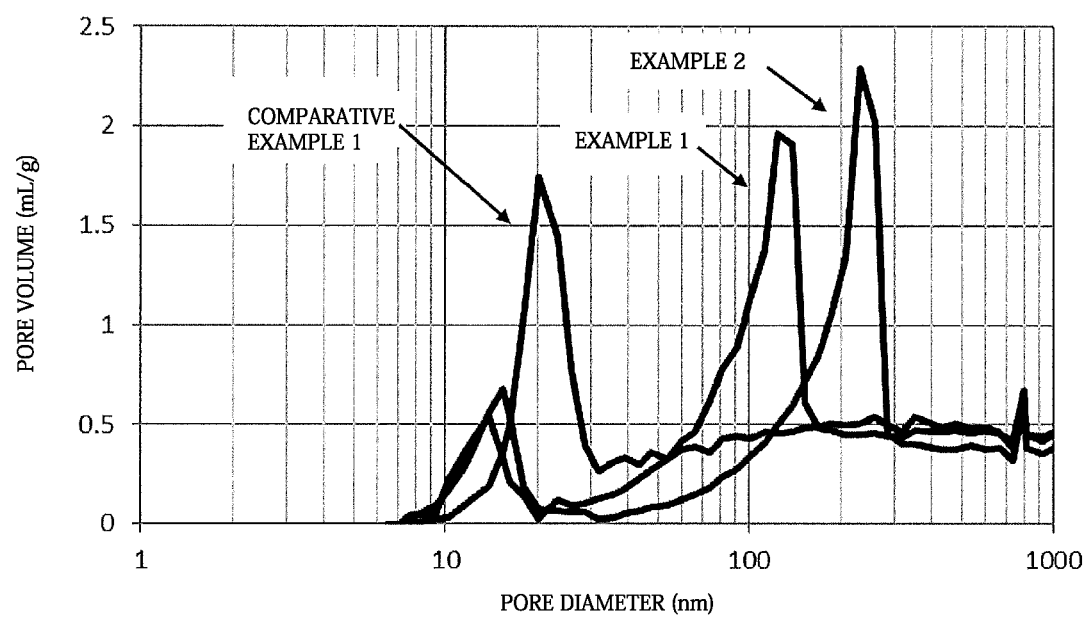
FIG. 1 is a diagram showing the pore distribution of a zirconia-based porous body of each of Example 1, Example 2, and Comparative Example 1.

Hereinafter, embodiments of the present invention will be described. However, the present invention is not limited only to these embodiments. In the present specification, general zirconia is used, and contains 10 mass % or less of an impurity metal compound including hafnia.

[Zirconia-Based Porous Body]

A zirconia-based porous body according to the present embodiment will be described in detail later, but the zirconia-based porous body contains zirconia as an essential component, and is preferably a composite oxide with an oxide other than zirconia (other metal oxide). The application of the zirconia-based porous body according to the present embodiment is not particularly limited, but the zirconia-based porous body is useful as a catalyst carrier for exhaust gas purification. When the zirconia-based porous body is used as the catalyst carrier for exhaust gas purification, examples of a catalyst which can be supported include a noble metal catalyst.

<Pore Volume>

The zirconia-based porous body according to the present embodiment has a total pore volume of 1.0 ml/g or more in a pore distribution based on a mercury intrusion method, wherein a pore volume of pores having a diameter of 20 nm or more and less than 100 nm is 0.3 ml/g or less, and a pore volume of pores having a diameter of 100 nm or more and 1000 nm or less is 0.5 ml/g or more.

The pore volume of the pores having a relatively large diameter of 100 nm or more and 1000 nm or less is 0.5 ml/g or more, whereby the zirconia-based porous body can be pulverized in a relatively short time. The pore volume of the pores having a relatively large diameter of 100 nm or more and 1000 nm or less is 0.5 ml/g or more, whereby performance deterioration caused by pulverization is suppressed. This is also clear from Examples.

The total pore volume is 1.0 ml/g or more, whereby the zirconia-based porous body has excellent catalyst performance when used as a catalyst material.

The total pore volume is 1.0 ml/g or more, preferably 1.1 ml/g or more, more preferably 1.2 ml/g or more, still more preferably 1.3 ml/g or more, and particularly preferably 1.5 ml/g or more.

The total pore volume is preferably 3.0 ml/g or less, more preferably 2.8 ml/g or less, still more preferably 2.6 ml/g or less, yet still more preferably 2.4 ml/g or less, and particularly preferably 2.0 ml/g or less.

The lower limit of the pore volume of the pores having a diameter of 20 nm or more and less than 100 nm is not particularly limited, but the pore volume of the pores having a diameter of 20 nm or more and less than 100 nm is preferably 0.01 ml/g or more, more preferably 0.02 ml/g or more, still more preferably 0.03 ml/g or more, yet still more preferably 0.04 ml/g or more, and particularly preferably 0.05 ml/g or more.

The pore volume of the pores having a diameter of 20 nm or more and less than 100 nm is 0.3 ml/g or less, preferably 0.2 ml/g or less, more preferably 0.18 ml/g or less, still more preferably 0.16 ml/g or less, yet still more preferably 0.14 ml/g or less, and particularly preferably 0.1 ml/g or less.

The pore volume of the pores having a diameter of 100 nm or more and 1000 nm or less is 0.5 ml/g or more, preferably 0.6 ml/g or more, more preferably 0.7 ml/g or more, still more preferably 0.8 ml/g or more, and particularly preferably 1.0 ml/g or more.

The pore volume of the pores having a diameter of 100 nm or more and 1000 nm or less is preferably 1.7 ml/g or less, more preferably 1.6 ml/g or less, still more preferably 1.5 ml/g or less, yet still more preferably 1.4 ml/g or less, and particularly preferably 1.3 ml/g or less.

It is preferable that the zirconia-based porous body has a total pore volume of 0.3 ml/g or more in a pore distribution based on a mercury intrusion method after a heat treatment at 1100° C. for 3 hours; a pore volume of pores having a diameter of 20 nm or more and less than 100 nm is 0.1 ml/g or less after a heat treatment at 1100° C. for 3 hours; and a pore volume of pores having a diameter of 100 nm or more and 1000 nm or less is 0.2 ml/g or more after a heat treatment at 1100° C. for 3 hours.

When the zirconia-based porous body has the total pore volume of 0.3 ml/g or more after the heat treatment at 1100° C. for 3 hours, and the pore volume of the pores having a diameter of 100 nm or more and 1000 nm or less after the heat treatment at 1100° C. for 3 hours is 0.2 ml/g or more, the zirconia-based porous body can be said to have a high pore volume even after the heat treatment. Therefore, the zirconia-based porous body can be said to have high catalytic performance even after being exposed to a high temperature.

The total pore volume after the heat treatment at 1100° C. for 3 hours is preferably 0.3 ml/g or more, more preferably 0.4 ml/g or more, still more preferably 0.5 ml/g or more, yet still more preferably 0.6 ml/g or more, and particularly preferably 0.7 ml/g or more.

The total pore volume after the heat treatment at 1100° C. for 3 hours is preferably 2.0 ml/g or less, more preferably 1.9 ml/g or less, still more preferably 1.8 ml/g or less, yet still more preferably 1.7 ml/g or less, and particularly preferably 1.6 ml/g or less.

The lower limit of the pore volume of the pores having a diameter of 20 nm or more and less than 100 nm after the heat treatment at 1100° C. for 3 hours is not particularly limited, but the pore volume of the pores having a diameter of 20 nm or more and less than 100 nm after the heat treatment at 1100° C. for 3 hours is preferably 0.01 ml/g or more, more preferably 0.02 ml/g or more, still more preferably 0.03 ml/g or more, yet still more preferably 0.04 ml/g or more, and particularly preferably 0.05 ml/g or more.

The pore volume of the pores having a diameter of 20 nm or more and less than 100 nm after the heat treatment at 1100° C. for 3 hours is preferably 0.1 ml/g or less, more preferably 0.09 ml/g or less, still more preferably 0.08 ml/g or less, yet still more preferably 0.07 ml/g or less, and particularly preferably 0.06 ml/g or less.

The pore volume of the pores having a diameter of 100 nm or more and 1000 nm or less after the heat treatment at 1100° C. for 3 hours is preferably 0.2 ml/g or more, more preferably 0.3 ml/g or more, still more preferably 0.4 ml/g or more, yet still more preferably 0.5 ml/g or more, and particularly preferably 0.6 ml/g or more.

The pore volume of the pores having a diameter of 100 nm or more and 1000 nm or less after the heat treatment at 1100° C. for 3 hours is preferably 1.6 ml/g or less, more preferably 1.5 ml/g or less, still more preferably 1.3 ml/g or less, yet still more preferably 1.1 ml/g or less, and particularly preferably 0.9 ml/g or less.

Details of determination of the total pore volume, the pore volume of the pores having a diameter of 20 nm or more and less than 100 nm, and the pore volume of the pores having a diameter of 100 nm or more and 1000 nm or less are based on a method described in Examples.

<Crystal Phase>

The zirconia-based porous body preferably contains one or more crystal phases selected from the group consisting of a monoclinic crystal phase (1), a tetragonal crystal phase (2), and a cubic crystal phase other than a pyrochlore phase ($Ce_2Zr_2O_7$) and a κ phase ($Ce_2Zr_2O_8$) (3).

The zirconia-based porous body preferably contains only one or more crystal phases selected from the group consisting of a monoclinic crystal phase (1), a tetragonal crystal phase (2), and a cubic crystal phase other than a pyrochlore phase and a κ phase (3).

When the zirconia-based porous body preferably contains one or more crystal phases selected from the group consisting of a monoclinic crystal phase (1), a tetragonal crystal phase (2), and a cubic crystal phase other than a pyrochlore phase and a κ phase (3), the zirconia-based porous body is likely to have a high pore volume (total pore volume) and a high specific surface area.

It is also preferable that the zirconia-based porous body contains only one or more crystal phases selected from the group consisting of a tetragonal crystal phase (2) and a cubic crystal phase other than a pyrochlore phase and a κ phase (3). This is because the tetragonal crystal phase and the cubic crystal phase are stabilized phases, and the zirconia-based porous body containing only the stabilized phase has high heat resistance, which has excellent catalytic performance.

The zirconia-based porous body does not contain a regular phase such as a pyrochlore phase or a κ phase. When the zirconia-based porous body contains the pyrochlore phase or the κ phase, the zirconia-based porous body tends to have a low pore volume and specific surface area. However, the zirconia-based porous body does not contain the regular phase such as a pyrochlore phase or a κ phase, whereby the zirconia-based porous body tends to have a high pore volume and specific surface area. The present inventor infers that when the pyrochlore phase or the κ phase which is the regular phase is formed during firing in the production of the zirconia-based porous body, the firing of the zirconia-based porous body is promoted, so that the zirconia-based porous body has a low pore volume and specific surface area.

The crystal phase of the zirconia-based porous body can be controlled by an element added to the zirconia-based porous body and the amount thereof added.

Zirconia (usually, zirconia to which a stabilizer such as an oxide of a rare earth element to be described later is added) is usually any one crystal phase of a monoclinic crystal phase, a tetragonal crystal phase, and a cubic crystal phase, or a crystal phase in which these coexist.

In the present specification, the phase ratios of the crystal phases contained in the zirconia-based porous body are determined by the following formulae.

$$\text{Monoclinic crystal phase ratio (\%)} = (Im(111)+Im(11\text{-}1))/(Im(111)+Im(11\text{-}1)+It(101)+Ic(111)) \times 100$$

$$\text{Tetragonal crystal phase ratio (\%)} = (100\% - \text{monoclinic crystal phase (\%)}) \times ((It(004)+It(220)/(It(004)+It(220)+Ic(004))) \times 100$$

$$\text{Cubic crystal phase ratio (\%)} = (100\% - \text{monoclinic crystal phase (\%)}) \times ((Ic(004)/(It(004)+It(220)+Ic(004))) \times 100$$

Here, Im(111) is the diffraction intensity of (111) in the monoclinic crystal phase, and Im(11-1) is the diffraction intensity of (11-1) in the monoclinic crystal phase.

It(101) is the diffraction intensity of (101) in the tetragonal crystal phase; It(220) is the diffraction intensity of (220) in the tetragonal crystal phase; and It(004) is the diffraction intensity of (004) in the tetragonal crystal phase.

Ic(004) is the diffraction intensity of (004) in the cubic crystal phase, and Ic(111) is the diffraction intensity of (111) in the cubic crystal phase.

The monoclinic crystal phase of zirconia is discriminated from the tetragonal crystal phase and the cubic crystal phase in the vicinity of 2θ=20 to 40° in the XRD spectrum. The tetragonal crystal phase is discriminated from the cubic crystal phase in the vicinity of 2θ=65 to 80° in the XRD spectrum. The cubic crystal phase may be distorted depending on the amount of the stabilizer added and the producing method, which may cause a peak position to shift. However, in the present specification, a peak between (004) and (220) in the tetragonal crystal phase is calculated as the peak of the cubic crystal phase.

<Specific Surface Area>

The zirconia-based porous body preferably has a specific surface area of 30 m$^2$/g or more and 150 m$^2$/g or less. When the specific surface area is 30 m$^2$/g or more and 150 m$^2$/g or less, the zirconia-based porous body can be said to have a high specific surface area in a state before pulverization.

The specific surface area is preferably 30 m²/g or more, more preferably 35 m²/g or more, still more preferably 40 m²/g or more, yet still more preferably 45 m²/g or more, and particularly preferably 50 m²/g or more.

The upper limit of the specific surface area is not particularly limited, but the specific surface area is 150 m²/g or less, preferably 148 m²/g or less, more preferably 145 m²/g or less, still more preferably 142 m²/g or less, and particularly preferably 140 m²/g or less.

The zirconia-based porous body preferably has a specific surface area of 20 m²/g or more after a heat treatment at 1000° C. for 3 hours. When the zirconia-based porous body has a specific surface area of 20 m²/g or more after the heat treatment at 1000° C. for 3 hours, the zirconia-based porous body can be said to have a high specific surface area even after the heat treatment. Therefore, the zirconia-based porous body can be said to have high catalytic performance even after being exposed to a high temperature.

The specific surface area after the heat treatment at 1000° C. for 3 hours is preferably 20 m²/g or more, more preferably 25 m²/g or more, still more preferably 30 m²/g or more, yet still more preferably 35 m²/g or more, and particularly preferably 40 m²/g or more.

The specific surface area after the heat treatment at 1000° C. for 3 hours is preferably 100 m²/g or less, more preferably 95 m²/g or less, still more preferably 90 m²/g or less, yet still more preferably 85 m²/g or less, and particularly preferably 80 m²/g or less.

The specific surface area after the heat treatment at 1000° C. for 3 hours is generally lower than that before the heat treatment.

The specific surface area (the specific surface area before the heat treatment) and the specific surface area after the heat treatment at 1000° C. for 3 hours refer to values obtained by a method described in Examples.

<Particle Size>

The particle size $D_{50}$ of the zirconia-based porous body is preferably 0.5 μm to 4.0 μm, more preferably 0.8 μm to 3.7 μm, and still more preferably 1.0 μm to 3.5 μm.

The particle size $D_{99}$ of the zirconia-based porous body is preferably 5.0 μm to 40 μm, more preferably 8.0 μm to 38 μm, and still more preferably 10 μm to 35 μm.

The particle size $D_{50}$ and the particle size $D_{99}$ refer to a particle size in a state where the zirconia-based porous body is produced, and not pulverized. The above "pulverizing" refers to fine pulverizing, and pulverizing due to a general technique such as a planetary mill, a ball mill, or a jet mill.

The zirconia-based porous body has a pore volume of 0.5 ml/g or more of pores having a diameter of 100 nm or more and 1000 nm or less, whereby the zirconia-based porous body is easily loosened in the process of producing the zirconia-based porous body, which tends to provide a small particle size (particle size $D_H$, particle size $D_{99}$) when the production is completed.

The particle size $D_{50}$ (particle size $D_{50}$ before pulverization) refers to a value obtained by a method described in Examples. The particle size $D_{99}$ (particle size $D_{99}$ before pulverization) refers to a value obtained in the same manner as in the particle size $D_{50}$.

<Specific Surface Area Maintenance Rate>

In the zirconia-based porous body, when a specific surface area after a heat treatment at 1100° C. for 3 hours is taken as A, and a specific surface area after 100 g of the zirconia-based porous body is dispersed in 250 g of ion-exchanged water, and a pH of the dispersed product is adjusted to 4.0 with nitric acid, followed by wet-pulverizing under the following wet pulverization conditions until a particle size $D_{50}$ becomes 1 μm or less, drying, and performing a heat treatment at 1100° C. for 3 hours is taken as B, a specific surface area maintenance rate represented by the following formula 1 (a specific surface area maintenance rate in the case of wet-pulverizing until the particle size $D_{50}$ becomes 1 μm or less) is 80% or more:

<wet pulverization conditions>
pulverizer: planetary ball mill
$ZrO_2$ pot: 500 cc
$ZrO_2$ beads (φ2 mm): 900 g
number of rotations: 400 rpm (specific surface area maintenance rate)=[(specific surface area $B$)/(specific surface area $A$)]×100 (%)  <Formula 1>

In the present specification, the wet pulverization of "until the particle size $D_{50}$ becomes 1 μm or less" refers to wet pulverization providing the particle size $D_{50}$ of 1.0 μm or less and 0.5 μm or more.

When the specific surface area maintenance rate (the specific surface area maintenance rate in the case of wet-pulverizing until the particle size $D_{50}$ becomes 1 μm or less) is 80% or more, the change in the specific surface area before and after pulverization can be said to be small. Therefore, it can be said that the catalyst performance is not significantly reduced by pulverization. The wet pulverization conditions are based on the assumption of wet pulverization which will be generally performed, and are conditions for quantitatively evaluating the amount of the change in the specific surface area before and after pulverization. It is not necessary to pulverize the zirconia-based porous body under the wet pulverization conditions when actually pulverizing the zirconia-based porous body.

The specific surface area maintenance rate (the specific surface area maintenance rate in the case of wet-pulverizing until the particle size $D_{50}$ becomes 1 μm or less) is preferably 80% or more, more preferably 85% or more, and still more preferably 90% or more.

The upper limit of the specific surface area maintenance rate (the specific surface area maintenance rate in the case of wet-pulverizing until the particle size $D_{50}$ becomes 1 μm or less) is not particularly limited, but the specific surface area maintenance rate is preferably less than 100%, and more preferably 99% or less.

In the zirconia-based porous body, it is preferable that when a specific surface area after a heat treatment at 1100° C. for 3 hours is taken as A, and a specific surface area after 100 g of the zirconia-based porous body is dispersed in 250 g of ion-exchanged water, and a pH of the dispersed product is adjusted to 4.0 with nitric acid, followed by wet-pulverizing under the following wet pulverization conditions until a particle size $D_{99}$ becomes 5 μm or less, drying, and performing a heat treatment at 1100° C. for 3 hours is taken as C, the specific surface area maintenance rate represented by the following formula 2 (the specific surface area maintenance rate in the case of wet-pulverizing until the particle size $D_{99}$ becomes 1 μm or less) is 80% or more:

<wet pulverization conditions>
pulverizer: planetary ball mill
$ZrO_2$ pot: 500 cc
$ZrO_2$ beads (φ 2 mm): 900 g
number of rotations: 400 rpm (specific surface area maintenance rate)=[(specific surface area $C$)/(specific surface area $A$)]×100 (%)  <Formula 2>

In the present specification, the wet pulverization of "until the particle size $D_{99}$ becomes 5 μm or less" refers to wet pulverization providing the particle size $D_{99}$ of 5.0 μm or less and 4.0 μm or more.

When the specific surface area maintenance rate (the specific surface area maintenance rate in the case of wet-pulverizing until the particle size $D_{99}$ becomes 5 μm or less) is 80% or more, the change in the specific surface area before and after pulverization can be said to be small. Therefore, it can be said that the catalyst performance is not significantly reduced by pulverization. The wet pulverization conditions are based on the assumption of wet pulverization which will be generally performed, and are conditions for quantitatively evaluating the amount of the change in the specific surface area before and after pulverization. It is not necessary to pulverize the zirconia-based porous body under the wet pulverization conditions when actually pulverizing the zirconia-based porous body.

The specific surface area maintenance rate (the specific surface area maintenance rate in the case of wet-pulverizing until the particle size $D_{99}$ becomes 5 μm or less) is preferably 80% or more, more preferably 85% or more, and still more preferably 90% or more.

The upper limit of the specific surface area maintenance rate (the specific surface area maintenance rate in the case of wet-pulverizing until the particle size $D_{99}$ becomes 5 μm or less) is not particularly limited, but the specific surface area maintenance rate is preferably less than 100%, and more preferably 99% or less.

<Composition>

The zirconia-based porous body contains zirconia. When the amount of the zirconia-based porous body is 100 mass %, the content of zirconia is preferably 30 mass % or more, more preferably 40 mass % or more, still more preferably 50 mass % or more, and particularly preferably 60 mass % or more. The upper limit of the content of zirconia is not particularly limited, but the content of zirconia is preferably 98 mass % or less, more preferably 97 mass % or less, still more preferably 95 mass % or less, and particularly preferably 90 mass % or less.

The zirconia-based porous body preferably contains one or more oxides selected from rare earth elements.

The rare earth elements refer to Sc, Y, La, Ce, Pr, Nd, Pm, Sm, Eu, Gd, Tb, Dy, Ho, Er, Tm, Yb, and Lu. However, it is preferable that the zirconia-based porous body does not contain Pm. That is, it is more preferable that the zirconia-based porous body contains one or more oxides selected from rare earth elements other than Pm.

It is preferable that when the amount of the zirconia-based porous body is 100%, the zirconia-based porous body contains 1 mass % or more and 60 mass % or less of the one or more oxides selected from rare earth elements.

The content of the one or more oxides selected from rare earth elements is preferably 1 mass % or more, more preferably 3 mass % or more, still more preferably 5 mass % or more, and particularly preferably 7 mass % or more.

The content of the one or more oxides selected from rare earth elements is preferably 60 mass % or less, more preferably 50 mass % or less, still more preferably 45 mass % or less, and particularly preferably 40 mass % or less.

Among the rare earth elements, Y (yttrium), La (lanthanum), Ce (cerium), Nd (neodymium), and Pr (praseodymium) are preferable. Among these, La, Ce, Nd, Pr, and Y are more preferable; La and Ce are still more preferable; and Ce is particularly preferable. That is, the zirconia-based porous body preferably contains one or more oxides selected from the group consisting of lanthanum oxide, cerium oxide, neodymium oxide, praseodymium oxide, and yttrium oxide.

The zirconia-based porous body may contain 0.1 mass % or more and 30 mass % or less of the one or more oxides selected from the group consisting of transition metal elements other than rare earth elements, aluminum, and silicon.

When the zirconia-based porous body contains 0.1 mass % or more and 30 mass % or less of the one or more oxides selected from the group consisting of transition metal elements other than rare earth elements, aluminum, and silicon, the thermal stability of the specific surface area can be further improved. That is, the amount of the change in the specific surface area can be further reduced before and after exposure to a high temperature, whereby the catalytic performance can be prevented from being significantly reduced.

When the content of the one or more oxides selected from the group consisting of transition metal elements other than rare earth elements, aluminum, and silicon is 30 mass % or less, an effect of suppressing performance deterioration caused by pulverization can be prevented from being significantly influenced.

When the amount of the zirconia-based porous body is 100 mass %, the content of the one or more oxides selected from the group consisting of transition metal elements other than rare earth elements, aluminum, and silicon is preferably 0.1 mass % or more, more preferably 1 mass % or more, still more preferably 2 mass % or more, and particularly preferably 4 mass % or more.

When the mount of the zirconia-based porous body is 100%, the content of the one or more oxides selected from the group consisting of transition metal elements other than rare earth elements, aluminum, and silicon is preferably 30 mass % or less, more preferably 20 mass % or less, still more preferably 10 mass % or less, and particularly preferably 5 mass % or less.

The composition of the zirconia-based porous body is specified by a method described in Examples.

[Method for Producing Zirconia-Based Porous Body]

Hereinafter, an example of a method for producing a zirconia-based porous body will be described. However, the method for producing a zirconia-based porous body of the present invention is not limited to the following examples.

A method for producing a zirconia-based porous body according to the present embodiment is a method including: a step A of adding a sulfating agent to a zirconium salt solution to form basic zirconium sulfate; a step B of neutralizing the basic zirconium sulfate to form zirconium hydroxide; and a step C of subjecting the zirconium hydroxide to a heat treatment to obtain a zirconia-based porous body. The step A is a step of holding the zirconium salt solution under conditions of a temperature of 100° C. or higher and 200° C. or lower and a pressure of $1.0 \times 10^5$ Pa or higher and $1.5 \times 10^6$ Pa or lower for 10 hours or more and 100 hours or less, and adding the sulfating agent to the zirconium salt solution.

<Step A>

In the method for producing a zirconia-based porous body according to the present embodiment, first, a sulfating agent is added to a zirconium salt solution to form basic zirconium sulfate (step A).

The zirconium salt is only required to supply zirconium ions, and for example, zirconium oxynitrate, zirconium oxychloride, and zirconium nitrate and the like can be used. One or two or more thereof may be used. Among these, zirconium oxychloride is preferable in terms of its high productivity on an industrial scale.

A solvent for forming a zirconium salt solution may be selected according to the type of the zirconium salt. Usually, water (pure water or ion-exchanged water, the same applies hereinafter) is preferable.

The concentration of the zirconium salt solution is not particularly limited, but generally, 5 to 250 g (particularly, 20 to 150 g) of zirconium oxide ($ZrO_2$) is desirably contained in 1000 g of the solvent.

The sulfating agent is not limited as long as the sulfating agent reacts with zirconium ions to form a sulfate (that is, a sulfating reagent), and examples thereof include sodium sulfate, potassium sulfate, and ammonium sulfate. The sulfating agent may be in any form such as a powder or solution form, but a solution (particularly, an aqueous solution) is preferable. The concentration of the solution to be used can be appropriately set.

The sulfating agent is preferably added so that the weight ratio of sulfate radical ($SO_4^{2-}$) to $ZrO_2$ is 0.3 to 0.6. The free acid concentration of a mixed solution is preferably 0.2 to 2.2N (normal). Examples of the free acid include sulfuric acid, nitric acid, and hydrochloric acid. The type of the free acid is not limited, but hydrochloric acid is preferable in terms of its high productivity on an industrial scale.

In the present embodiment, in this step A, the zirconium salt solution is held under conditions of a temperature of 100° C. or higher and 200° C. or lower and a pressure of $1.0 \times 10^5$ Pa or higher and $1.5 \times 10^6$ Pa or lower for 10 hours or more and 100 hours or less, and the sulfating agent is then added to the zirconium salt solution. That is, the sulfating agent is not added immediately after the zirconium salt solution is heated to a high temperature (temperature: 100° C. or higher and 200° C. or lower), but the zirconium salt solution is heated to high temperature (temperature: 100° C. or higher and 200° C. or lower), and then kept as it were for a predetermined time (10 hours or more and 100 hours or less), followed by adding a sulfating agent. This makes it possible to easily provide a zirconia-based porous body having a large pore volume of pores having a diameter of 100 nm or more and 1000 nm or less.

The present inventor infers the reason as follows.

By holding the zirconium salt solution under conditions of a temperature of 100° C. or higher and 200° C. or lower and a pressure of $1.0 \times 10^5$ Pa or higher and $1.5 \times 10^6$ Pa or lower for 10 hours or more and 100 hours or less, minute cores grow. Then, by adding the sulfating agent, the minute cores are loosely connected to each other, and basic zirconium sulfate containing a large number of pores having a relatively large diameter (pores having a diameter of 100 nm or more and 1000 nm or less) is obtained. As a result, the pore volume of the pores having a diameter of 100 nm or more and 1000 nm or less and contained in the finally obtained zirconia-based porous body is considered to be increased.

When the sulfating agent is added immediately after the zirconium salt solution is heated to a high temperature (for example, 100° C. or higher and 200° C. or lower), the sulfating agent is added in a state where the cores do not grow, so that the zirconium salt solution is strongly aggregated. Therefore, basic zirconium sulfate containing a number of pores having a relatively small diameter is obtained.

The temperature at which the zirconium salt solution is held before the addition of the sulfating agent is preferably 100° C. or higher, and more preferably 110° C. or higher.

The temperature at which the zirconium salt solution is held before the addition of the sulfating agent is preferably 200° C. or lower, and more preferably 190° C. or lower.

The pressure at which the zirconium salt solution is held before the addition of the sulfating agent is preferably $1.0 \times 10^3$ Pa or more, and more preferably $1.2 \times 10^5$ Pa or more.

The pressure at which the zirconium salt solution is held before the addition of the sulfating agent is preferably $1.4 \times 10^6$ Pa or less, and more preferably $1.3 \times 10^6$ Pa or less.

The period for which the zirconium salt solution is held before the addition of the sulfating agent is preferably 10 hours or more, and more preferably 20 hours or more.

The period for which the zirconium salt solution is held before the addition of the sulfating agent is preferably 100 hours or less, and more preferably 80 hours or less.

This step A is not particularly limited, but the step A is preferably performed in an autoclave which facilitates the control of the temperature and pressure.

The sulfating agent is preferably added at the same temperature as that of the zirconium salt solution. The zirconium salt solution reacts with the chlorinate sulfate to form basic zirconium sulfate.

After the sulfating agent is added, the reaction liquid is preferably held in an autoclave for 10 to 60 minutes to age the formed basic zirconium sulfate. The basic zirconium sulfate is not limited, and examples thereof include hydrates of compounds such as $ZrOSO_4 \cdot ZrO_2$, $5ZrO_2 \cdot 3SO_3$, and $7ZrO_2 \cdot 3SO_3$. The basic zirconium sulfate may be one or a mixture of two or more of the compounds.

It is preferable that when the zirconia-based porous body contains one or more oxides selected from the group consisting of rare earth elements, transition metal elements other than the rare earth elements, aluminum, and silicon, a salt solution or compound of one or two or more metals selected from the group consisting of a predetermined amount of rare earth elements, transition metal elements other than the rare earth elements, aluminum, and silicon is preferably added before a neutralizing step (step B) to be described later after sulfating.

Then, a slurry containing basic zirconium sulfate is removed from the autoclave, and cooled to 80° C. or lower, and preferably 60° C. or lower.

<Step B>

Next, zirconium hydroxide is formed by neutralizing the basic zirconium sulfate (step B). Specifically, zirconium hydroxide is formed by neutralizing the basic zirconium sulfate with an alkali. The alkali is not limited, and for example, ammonium hydroxide, ammonium bicarbonate, sodium hydroxide, and potassium hydroxide and the like can be used. Among these, sodium hydroxide is preferable from the viewpoint of industrial cost.

The amount of the alkali added is not particularly limited as long as zirconium hydroxide can be formed as a precipitate from a basic zirconium sulfate solution. Usually, the alkali is added so that the pH of the solution is 11 or more, and preferably 12 or more.

After the neutralization reaction, the zirconium hydroxide-containing solution is preferably held at 35 to 60° C. for 1 hour or more. As a result, the formed precipitate is aged while also facilitating filtration.

Next, the zirconium hydroxide is recovered by a solid-liquid separation method. For example, filtration, centrifugation, and decantation and the like can be used.

After the zirconium hydroxide is recovered, the zirconium hydroxide is preferably washed with water to remove adhered impurities.

The zirconium hydroxide may be dried by natural drying or heat drying.

<Step C>

Next, the zirconium hydroxide is subjected to a heat treatment (fired) to obtain a zirconia-based porous body (step C). The heat treatment temperature is not particularly limited, but the zirconium hydroxide is preferably subjected to a heat treatment at about 400 to 900° C. for about 1 to 5 hours. The heat treatment atmosphere is preferably air or an oxidizing atmosphere.

The obtained zirconia-based porous body may be subjected to a treatment for disaggregating for the purpose of improving handleability, if necessary.

The method for producing the zirconia-based porous body according to the present embodiment has been described above.

EXAMPLES

Hereinafter, the present invention will be described in detail with reference to Examples, but the present invention is not limited to the following Examples as long as the gist of the present invention is not exceeded. A zirconia-based porous body obtained in each of Examples and Comparative Examples contains 1.3 to 2.5 mass % of hafnium oxide as an unavoidable impurity with respect to zirconium oxide (calculated by the following formula (X)).

([Mass of Hafnium Oxide]/([Mass of Zirconium Oxide]+[Mass of Hafnium Oxide]))×100(%)  <Formula (X)>

[Preparation of Zirconia-Based Porous Body]

Example 1

155 g (60 g in terms of $ZrO_2$) of zirconium oxychloride-octahydrate was dissolved in ion-exchanged water, and an acid concentration and a $ZrO_2$ concentration were then respectively adjusted to 0.67N and 4 w/v % (mass-volume percent concentration) by 35 mass % hydrochloric acid and ion-exchanged water to obtain a zirconium salt solution.

The obtained zirconium salt solution was placed in an autoclave, and heated to 130° C. After the zirconium salt solution was heated to 130° C., the zirconium salt solution was held at a pressure of $1.3 \times 10^5$ Pa for 1 day (24 hours). The time from start of temperature rise until 130° C. was reached was 1 hour.

After 1 day, 1065 g of 5% sodium sulfate (sulfating agent) was added in an autoclave held under conditions of 130° C. and $1.3 \times 10^5$ Pa, followed by holding as it was for 15 minutes. Then, the solution was allowed to cool to room temperature (25° C.) to obtain a basic zirconium sulfate-containing slurry.

To the obtained basic zirconium sulfate-containing slurry, 300 g of a cerium nitrate solution (30 g in terms of $CeO_2$), 50 g of a lanthanum nitrate solution (5 g in terms of $La_2O_3$), and 50 g of a neodymium nitrate solution (5 g in terms of $Nd_2O_3$) were added.

Next, 500 g of 25% sodium hydroxide (alkali for neutralization) was added over 60 minutes to form a hydroxide precipitate.

The obtained hydroxide precipitate was filtered, and sufficiently washed with water. The obtained hydroxide was dried at 105° C. for 24 hours. The dried hydroxide was subjected to a heat treatment (fired) at 600° C. in air for 5 hours. The obtained fired product was loosened with a hammer type head (MF 10.2 hammer type head manufactured by IKA) to obtain a zirconia-based porous body according to Example 1.

Example 2

A zirconia-based porous body according to Example 2 was obtained in the same manner as in Example 1 except that a zirconium salt solution was held at 130° C. and a pressure of $1.3 \times 10^5$ Pa for 2 days (48 hours) instead of being held at 130° C. and a pressure of $1.3 \times 10^5$ Pa for 1 day (24 hours).

Example 3

168 g (65 g in terms of $ZrO_2$) of zirconium oxychloride-octahydrate was dissolved in ion-exchanged water, and an acid concentration and a $ZrO_2$ concentration were then respectively adjusted to 0.67N and 4 w/v % (mass-volume percent concentration) by 35 mass % hydrochloric acid and ion-exchanged water to obtain a zirconium salt solution.

The obtained zirconium salt solution was placed in an autoclave, and heated to 130° C. After the zirconium salt solution was heated to 130° C., the zirconium salt solution was held at a pressure of $1.3 \times 10^5$ Pa for 1 day (24 hours). The time from start of temperature rise until 130° C. was reached was 1 hour.

After 1 day, 1154 g of 5% sodium sulfate (sulfating agent) was added in an autoclave held under conditions of 130° C. and $1.3 \times 10^5$ Pa, followed by holding as it was for 15 minutes. Then, the solution was allowed to cool to room temperature (25° C.) to obtain a basic zirconium sulfate-containing slurry.

To the obtained basic zirconium sulfate-containing slurry, 200 g of a cerium nitrate solution (20 g in terms of $CeO_2$), 50 g of a lanthanum nitrate solution (5 g in terms of $La_2O_3$), and 100 g of an yttrium nitrate solution (10 g in terms of $Y_2O_3$) were added.

Next, 500 g of 25% sodium hydroxide (alkali for neutralization) was added over 60 minutes to form a hydroxide precipitate.

Then, a zirconia-based porous body according to Example 3 was obtained in the same manner as in Example 1.

Example 4

129 g (50 g in terms of $ZrO_2$) of zirconium oxychloride-octahydrate was dissolved in ion-exchanged water, and an acid concentration and a $ZrO_2$ concentration were then respectively adjusted to 0.67N and 4 w/v % (mass-volume percent concentration) by 35 mass % hydrochloric acid and ion-exchanged water to obtain a zirconium salt solution.

The obtained zirconium salt solution was placed in an autoclave, and heated to 130° C. After the zirconium salt solution was heated to 130° C., the zirconium salt solution was held at a pressure of $1.3 \times 10^5$ Pa for 2 days (48 hours). The time from start of temperature rise until 130° C. was reached was 1 hour.

After 2 days, 888 g of 5% sodium sulfate (sulfating agent) was added in an autoclave held under conditions of 130° C. and $1.3 \times 10^5$ Pa, followed by holding as it was for 15 minutes. Then, the solution was allowed to cool to room temperature (25° C.) to obtain a basic zirconium sulfate-containing slurry.

To the obtained basic zirconium sulfate-containing slurry, 400 g of a cerium nitrate solution (40 g in terms of $CeO_2$), 50 g of a lanthanum nitrate solution (5 g in terms of $La_2O_3$), and 50 g of a praseodymium nitrate solution (5 g in terms of $Pr_6O_{11}$) were added.

Next, 500 g of 25% sodium hydroxide (alkali for neutralization) was added over 60 minutes to form a hydroxide precipitate.

Then, a zirconia-based porous body according to Example 4 was obtained in the same manner as in Example 1.

Example 5

103 g (40 g in terms of $ZrO_2$) of zirconium oxychloride-octahydrate was dissolved in ion-exchanged water, and an acid concentration and a $ZrO_2$ concentration were then respectively adjusted to 0.67N and 4 w/v % (mass-volume percent concentration) by 35 mass % hydrochloric acid and ion-exchanged water to obtain a zirconium salt solution.

The obtained zirconium salt solution was placed in an autoclave, and heated to 130° C. After the zirconium salt solution was heated to 130° C., the zirconium salt solution was held at a pressure of $1.3 \times 10^5$ Pa for 2 days (48 hours). The time from start of temperature rise until 130° C. was reached was 1 hour.

After 2 days, 710 g of 5% sodium sulfate (sulfating agent) was added in an autoclave held under conditions of 130° C. and $1.3 \times 10^5$ Pa, followed by holding as it was for 15 minutes. Then, the solution was allowed to cool to room temperature (25° C.) to obtain a basic zirconium sulfate-containing slurry.

To the obtained basic zirconium sulfate-containing slurry, 550 g of a cerium nitrate solution (55 g in terms of $CeO_2$) and 50 g of a lanthanum nitrate solution (5 g in terms of $La_2O_3$) were added.

Next, 500 g of 25% sodium hydroxide (alkali for neutralization) was added over 60 minutes to form a hydroxide precipitate.

Then, a zirconia-based porous body according to Example 5 was obtained in the same manner as in Example 1.

Example 6

232 g (90 g in terms of $ZrO_2$) of zirconium oxychloride-octahydrate was dissolved in ion-exchanged water, and an acid concentration and a $ZrO_2$ concentration were then respectively adjusted to 0.67N and 4 w/v % (mass-volume percent concentration) by 35 mass % hydrochloric acid and ion-exchanged water to obtain a zirconium salt solution.

The obtained zirconium salt solution was placed in an autoclave, and heated to 130° C. After the zirconium salt solution was heated to 130° C., the zirconium salt solution was held at a pressure of $1.3 \times 10^5$ Pa for 2 days (48 hours). The time from start of temperature rise until 130° C. was reached was 1 hour.

After 2 days, 1598 g of 5% sodium sulfate (sulfating agent) was added in an autoclave held under conditions of 130° C. and $1.3 \times 10^5$ Pa, followed by holding as it was for 15 minutes. Then, the solution was allowed to cool to room temperature (25° C.) to obtain a basic zirconium sulfate-containing slurry.

To the obtained basic zirconium sulfate-containing slurry, 70 g of a cerium nitrate solution (7 g in terms of $CeO_2$) and 30 g of a sodium silicate solution (3 g in terms of $SiO_2$) were added.

Next, 500 g of 25% sodium hydroxide (alkali for neutralization) was added over 60 minutes to form a hydroxide precipitate.

Then, a zirconia-based porous body according to Example 6 was obtained in the same manner as in Example 1.

Example 7

154 g (59.9 g in terms of $ZrO_2$) of zirconium oxychloride-octahydrate was dissolved in ion-exchanged water, and an acid concentration and a $ZrO_2$ concentration were then respectively adjusted to 0.67N and 4 w/v % (mass-volume percent concentration) by 35 mass % hydrochloric acid and ion-exchanged water to obtain a zirconium salt solution.

The obtained zirconium salt solution was placed in an autoclave, and heated to 130° C. After the zirconium salt solution was heated to 130° C., the zirconium salt solution was held at a pressure of $1.3 \times 10^5$ Pa for 2 days (48 hours). The time from start of temperature rise until 130° C. was reached was 1 hour.

After 2 days, 1065 g of 5% sodium sulfate (sulfating agent) was added in an autoclave held under conditions of 130° C. and $1.3 \times 10^5$ Pa, followed by holding as it was for 15 minutes. Then, the solution was allowed to cool to room temperature (25° C.) to obtain a basic zirconium sulfate-containing slurry.

To the obtained basic zirconium sulfate-containing slurry, 300 g (30 g in terms of $CeO_2$) of a cerium nitrate solution, 50 g (5 g in terms of $La_2O_3$) of a lanthanum nitrate solution, 50 g of a neodymium nitrate solution (5 g in terms of $Nd_2O_3$), and 1 g (0.1 g in terms of $Fe_2O_3$) of an iron nitrate solution were added.

Next, 500 g of 25% sodium hydroxide (alkali for neutralization) was added over 60 minutes to form a hydroxide precipitate.

Then, a zirconia-based porous body according to Example 7 was obtained in the same manner as in Example 1.

Example 8

142 g (55 g in terms of $ZrO_2$) of zirconium oxychloride-octahydrate was dissolved in ion-exchanged water, and an acid concentration and a $ZrO_2$ concentration were then respectively adjusted to 0.67N and 4 w/v % (mass-volume percent concentration) by 35 mass % hydrochloric acid and ion-exchanged water to obtain a zirconium salt solution.

The obtained zirconium salt solution was placed in an autoclave, and heated to 130° C. After the zirconium salt solution was heated to 130° C., the zirconium salt solution was held at a pressure of $1.3 \times 10^5$ Pa for 2 days (48 hours). The time from start of temperature rise until 130° C. was reached was 1 hour.

After 2 days, 1065 g of 5% sodium sulfate (sulfating agent) was added in an autoclave held under conditions of 130° C. and $1.3 \times 10^5$ Pa, followed by holding as it was for 15 minutes. Then, the solution was allowed to cool to room temperature (25° C.) to obtain a basic zirconium sulfate-containing slurry.

To the obtained basic zirconium sulfate-containing slurry, 300 g (30 g in terms of $CeO_2$) of a cerium nitrate solution, 50 g (5 g in terms of $La_2O_3$) of a lanthanum nitrate solution, 50 g (5 g in terms of $Nd_2O_3$) of a neodymium nitrate solution, and 50 g (5 g in terms of NiO) of a nickel nitrate solution were added.

Next, 500 g of 25% sodium hydroxide (alkali for neutralization) was added over 60 minutes to form a hydroxide precipitate.

Then, a zirconia-based porous body according to Example 8 was obtained in the same manner as in Example 1.

Comparative Example 1

155 g (60 g in terms of $ZrO_2$) of zirconium oxychloride-octahydrate was dissolved in ion-exchanged water, and an acid concentration and a $ZrO_2$ concentration were then respectively adjusted to 0.67N and 4 w/v % (mass-volume percent concentration) by 35 mass % hydrochloric acid and ion-exchanged water to obtain a zirconium salt solution.

The obtained zirconium salt solution was placed in an autoclave, and heated to 130° C. After the zirconium salt solution was heated to 130° C., 1065 g of 5% sodium sulfate (sulfating agent) was immediately added thereto at a pressure of $1.3 \times 10^3$ Pa, followed by holding as it was for 15 minutes. The time from start of temperature rise until 130° C. was reached was 1 hour. Then, the solution was allowed to cool to room temperature (25° C.) to obtain a basic zirconium sulfate-containing slurry.

Then, a zirconia-based porous body according to Comparative Example 1 was obtained in the same manner as in Example 1.

Comparative Example 2

168 g (65 g in terms of $ZrO_2$) of zirconium oxychloride-octahydrate was dissolved in ion-exchanged water, and an acid concentration and a $ZrO_2$ concentration were then respectively adjusted to 0.67N and 4 w/v % (mass-volume percent concentration) by 35 mass % hydrochloric acid and ion-exchanged water to obtain a zirconium salt solution.

The obtained zirconium salt solution was placed in an autoclave, and heated to 130° C. After the zirconium salt solution was heated to 130° C., 1065 g of 5% sodium sulfate (sulfating agent) was immediately added thereto at a pressure of $1.3 \times 10^5$ Pa, followed by holding as it was for 15 minutes. The time from start of temperature rise until 130° C. was reached was 1 hour. Then, the solution was allowed to cool to room temperature (25° C.) to obtain a basic zirconium sulfate-containing slurry.

Then, a zirconia-based porous body according to Comparative Example 2 was obtained in the same manner as in Example 3.

Comparative Example 3

113 g (44 g in terms of $ZrO_2$) of zirconium oxychloride-octahydrate was dissolved in ion-exchanged water, and an acid concentration and a $ZrO_2$ concentration were then respectively adjusted to 0.67N and 4 w/v % (mass-volume percent concentration) by 35 mass % hydrochloric acid and ion-exchanged water to obtain a zirconium salt solution.

The obtained zirconium salt solution was placed in an autoclave, and heated to 130° C. After the zirconium salt solution was heated to 130° C., the zirconium salt solution was held at a pressure of $1.3 \times 10^5$ Pa for 2 days (48 hours). The time from start of temperature rise until 130° C. was reached was 1 hour.

After 2 days, 781 g of 5% sodium sulfate (sulfating agent) was added in an autoclave held under conditions of 130° C. and $1.3 \times 10^5$ Pa, followed by holding as it was for 15 minutes. Then, the solution was allowed to cool to room temperature (25° C.) to obtain a basic zirconium sulfate-containing slurry.

To the obtained basic zirconium sulfate-containing slurry, 560 g of a cerium nitrate solution (56 g in terms of $CeO_2$) was added.

Next, 500 g of 25% sodium hydroxide (alkali for neutralization) was added over 60 minutes to form a hydroxide precipitate.

The obtained hydroxide precipitate was filtered, and sufficiently washed with water. The obtained hydroxide was dried at 105° C. for 24 hours. The dried hydroxide was subjected to a heat treatment (fired) at 1000° C. for 5 hours in a 5% hydrogen/argon stream. The obtained fired product was loosened with a hammer type head (MF 10.2 hammer type head manufactured by IKA) to obtain a zirconia-based porous body according to Comparative Example 3.

[Measurement of Composition of Zirconia-Based Porous Body]

The composition (in terms of oxide) of the zirconia-based porous body of each of Examples and Comparative Examples was analyzed using ICP-AES ("ULTIMA-2" manufactured by HORIBA). The results are shown in Table 1.

[Measurement of Pore Volume before Heat Treatment]

The pore distribution of the zirconia-based porous body of each of Examples and Comparative Examples was obtained by a mercury intrusion method using a pore distribution measuring device ("Autopore IV9500" manufactured by Micromeritics). The measurement conditions were as follows.

<Measurement Conditions>
Measuring device: pore distribution measuring device (Autopore IV9500 manufactured by Micromeritics)
Measuring range: 0.0036 to 10.3 μm
Number of measurement points: 120 points
Mercury contact angle: 140 degrees
Mercury surface tension: 480 dyne/cm Using the obtained pore distribution, the total pore volume, the pore volume of the pores having a diameter of 20 nm or more and less than 100 nm, and the pore volume of the pores having a diameter of 100 nm or more and 1000 nm or less were determined. The results are shown in a "before heat treatment" column of Table 1.

The pore distribution of the obtained zirconia-based porous body for each of Example 1, Example 2, and Comparative Example 1 is shown in FIG. 1.

[Identification of Crystal Phases]

The X-ray diffraction spectrum of the zirconia-based porous body of each of Examples and Comparative Examples was obtained using an X-ray diffractometer ("RINT2500" manufactured by Rigaku Corporation). The measurement conditions were as follows.

<Measurement Conditions>
Measuring instrument: X-ray diffractometer (RINT2500 manufactured by Rigaku Corporation)
Radiation source: CuKα radiation source
Tube voltage: 50 kV
Tube current: 300 mA
Scanning speed: 1°/min
Step size: 0.01° (2θ)

Then, the crystal phases were identified from the X-ray diffraction spectrum. The phase ratio of each crystal phase included in the zirconia-based porous body was calculated by the following formula.

Monoclinic crystal phase ratio (%)=(Im(111)+Im(11-1))/(Im(111)+Im(11-1)+It(101)+Ic(111))×100

Tetragonal crystal phase ratio (%)=(100%−monoclinic crystal phase (%))×((It(004)+It(220)/(It(004)+It(220)+Ic(004))×100

Cubic crystal phase ratio (%)=(100%−monoclinic crystal phase (%))×((Ic(004)/(It(004)+It(220)+Ic(004))×100

Here, Im(111) is the diffraction intensity of (111) in the monoclinic crystal phase, and Im(11-1) is the diffraction intensity of (11-1) in the monoclinic crystal phase.

It(101) is the diffraction intensity of (101) in the tetragonal crystal phase; It(220) is the diffraction intensity of (220) in the tetragonal crystal phase; and It(004) is the diffraction intensity of (004) in the tetragonal crystal phase.

Ic(004) is the diffraction intensity of (004) in the cubic crystal phase, and Ic(111) is the diffraction intensity of (111) in the cubic crystal phase.

Figure 2:
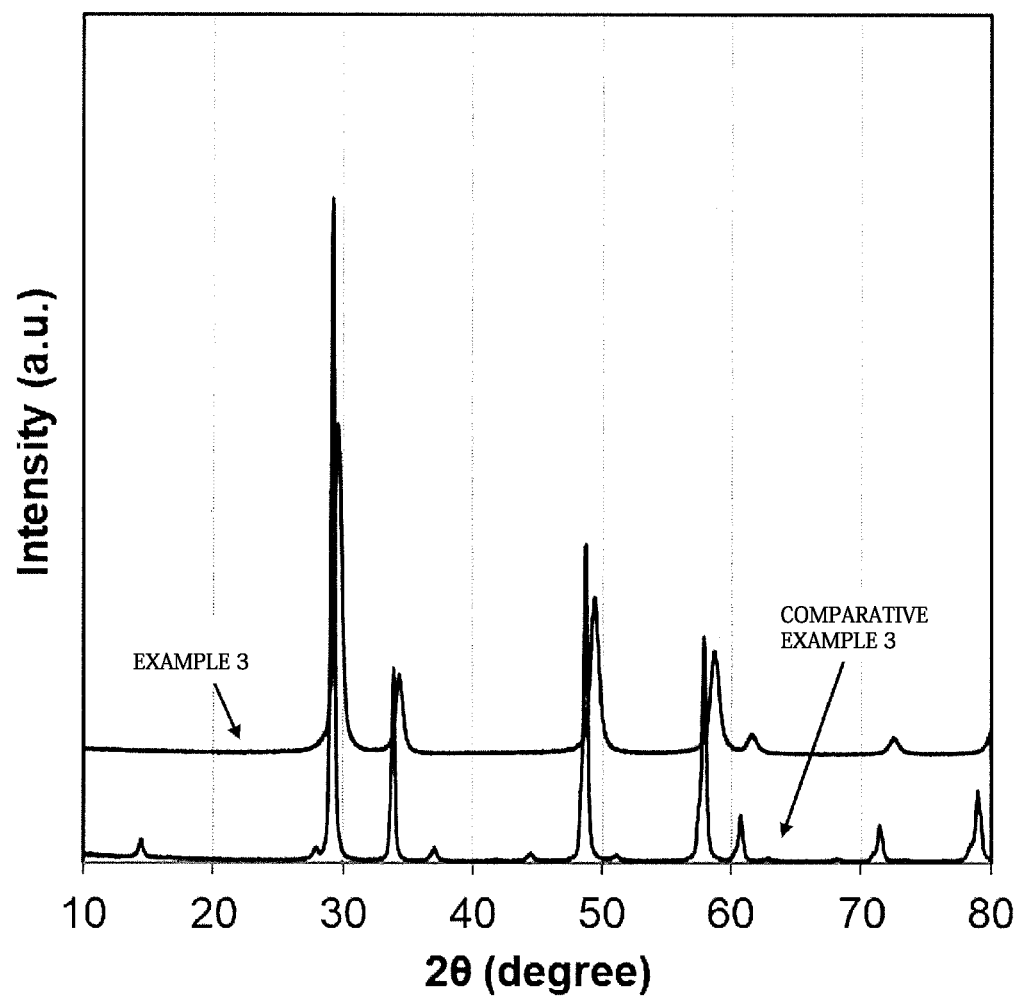
FIG. 2 is a diagram showing the X-ray diffraction spectrum of a zirconia-based porous body of each of Example 3 and Comparative Example 3.

The monoclinic crystal phase of zirconia was discriminated from the tetragonal crystal phase and the cubic crystal phase in the vicinity of 2θ=20 to 40° in the XRD spectrum. The tetragonal crystal phase was discriminated from the cubic crystal phase in the vicinity of 2θ=65 to 80° in the XRD spectrum. The cubic crystal phase may be distorted depending on the amount of the stabilizer added and the producing method, which may cause a peak position to shift. However, in the present Examples, a peak between (004) and (220) in the tetragonal crystal phase is calculated as the peak of the cubic crystal phase. The results are shown in Table 1. The obtained X-ray diffraction spectrum for each of Example 3 and Comparative Example 3 is shown in FIG. 2. In Comparative Example 3, peaks due to a pyrochlore phase (2θ=14.5°, 28.0°, and 37.1° and the like) were observed, whereas in Example 3, no peak due to a pyrochlore phase was observed.

[Measurement of Specific Surface Area Before Heat Treatment]

The specific surface area of the zirconia-based porous body of each of Examples and Comparative Examples was measured by the BET method using a specific surface area meter ("Macsorb" manufactured by Mountec). The results are shown in a "specific surface area before pulverization" column of "before heat treatment" in Table 1.

[Confirmation of Easiness of Pulverization]

Figure 3:
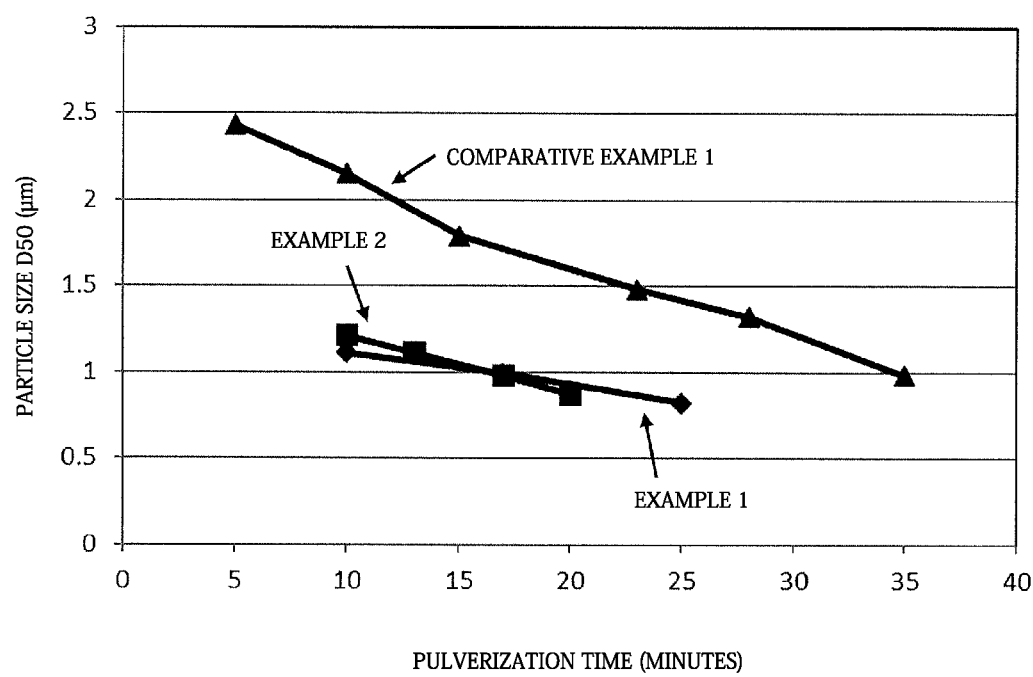
FIG. 3 is a diagram showing the pulverization behavior of a zirconia-based porous body of each of Example 1, Example 2, and Comparative Example 1.

100 g of the zirconia-based porous body of each of Examples and Comparative Examples was dispersed in 250 g of ion-exchanged water, and the pH of the dispersed product was adjusted to 4.0 with nitric acid. Pulverization was performed under the following wet pulverization conditions, and the time until a particle size $D_{50}$ became 1 μm or less was measured. Specifically, after the start of wet pulverization, a sample was periodically sampled from a planetary ball mill, and the particle size $D_{50}$ was measured to confirm whether or not the particle size was 1 μm or less. The pulverization behavior of each of Example 1, Example 2, and Comparative Example 1 was shown in FIG. 3.

<wet pulverization conditions>
pulverizer: planetary ball mill
$ZrO_2$ pot: 500 cc
$ZrO_2$ beads (φ 2 mm): 900 g
number of rotations: 400 rpm As a result, the time until the particle size $D_{50}$ became 1 μm or less was about 17 minutes from the start of pulverization in Example 1, about 17 minutes in Example 2, about 15 minutes in Example 3, about 17 minutes in Example 4, about 17 minutes in Example 5, about 17 minutes in Example 6, about 15 minutes in Example 7, about 17 minutes in Example 8, about 35 minutes in Comparative Example 1, about 40 minutes in Comparative Example 2, and about 17 minutes in Comparative Example 3.

A laser diffraction type particle size distribution measuring device ("SALD-2300" manufactured by Shimadzu Corporation) was used to measure the particle size $D_{50}$.

From the above, the zirconia-based porous body of each of Examples was confirmed to be able to be pulverized so that the particle size $D_{50}$ became 1 μm or less in a short time as compared with the zirconia-based porous body of each of Comparative Examples.

[Measurement of Specific Surface Area after Pulverization Before Heat Treatment]

A sample having a particle size $D_{50}$ of 1 μm or less by wet pulverization according to the above "Confirmation of Easiness of Pulverization" was sufficiently dried to obtain a zirconia-based porous body after pulverization.

The specific surface area of the obtained zirconia-based porous body after pulverization was measured in the same manner as in "Measurement of Specific Surface Area before Heat Treatment". The results are shown in a "Specific Surface Area after Pulverization" column of "Before Heat Treatment" in Table 1.

<wet pulverization conditions>
pulverizer: planetary ball mill
$ZrO_2$ pot: 500 cc
$ZrO_2$ beads (φ2 mm): 900 g
number of rotations: 400 rpm

[Measurement of Particle Size $D_{50}$ Before Pulverization before Heat Treatment]

0.15 g of the zirconia-based porous body (powder) of each of Examples and Comparative Examples and 40 ml of a 0.2% sodium hexametaphosphate aqueous solution were placed in a 50-ml beaker, and dispersed in a desktop ultrasonic cleaner "W-113" (manufactured by Honda Electronics Corporation) for 5 minutes, followed by placing the dispersed product in the device (laser diffraction type particle size distribution measuring device ("SALD-2300" manufactured by Shimadzu Corporation)) for measurement. The results are shown in a "Particle Size $D_{50}$" column of "before Heat Treatment" in Table 1.

[Measurement of Specific Surface Area after Heat Treatment at 1000° C. for 3 hours]

The zirconia-based porous body of each of Examples and Comparative Examples was subjected to a heat treatment at 1000° C. for 3 hours. The specific surface area of the zirconia-based porous body after the heat treatment at 1000° C. for 3 hours was measured in the same manner as in "Measurement of Specific Surface Area before Heat Treatment". The results are shown in a "Specific Surface Area" column of "Physical Properties after Heat Treatment at 1000° C. for 3 hours" in Table 1.

[Measurement of Pore Volume after Heat Treatment at 1100° C. for 3 Hours]

The zirconia-based porous body of each of Examples and Comparative Examples was subjected to a heat treatment at 1100° C. for 3 hours. The pore distribution of the zirconia-based porous body after the heat treatment at 1100° C. for 3 hours was obtained in the same manner as in "Measurement of Pore Volume before Heat Treatment". Using the obtained pore distribution, the total pore volume, the pore volume of the pores having a diameter of 20 nm or more and less than 100 nm, and the pore volume of the pores having a diameter of 100 nm or more and 1000 nm or less were determined. The results are shown in a "Physical Properties after Heat Treatment at 1100° C. for 3 hours" column in Table 1.

[Measurement of Specific Surface Area after Heat Treatment at 1100° C. for 3 Hours]

The zirconia-based porous body of each of Examples and Comparative Examples was subjected to a heat treatment at 1100° C. for 3 hours. The specific surface area of the zirconia-based porous body after the heat treatment at 1100° C. for 3 hours was measured in the same manner as in "Measurement of Specific Surface Area before Heat Treatment". The results are shown in a "Specific Surface Area before Pulverization" column of "Physical Properties after Heat Treatment at 1100° C. for 3 hours" in Table 1. The "Specific Surface Area before Pulverization" of "Physical Properties after Heat Treatment at 1100° C. for 3 Hours" in Table 1 corresponds to "Specific Surface Area A" in the present specification.

[Measurement of Specific Surface Area after Heat Treatment at 1100° C. for 3 Hours after Pulverization]

A zirconia-based porous body after pulverization before a heat treatment was obtained by the same method as that described in the section "Measurement of Specific Surface Area after Pulverization before Heat Treatment". The obtained zirconia-based porous body after pulverization before a heat treatment was subjected to a heat treatment at 1100° C. for 3 hours. The specific surface area of the zirconia-based porous body after the heat treatment was measured in the same manner as in "Measurement of Specific Surface Area before Heat Treatment". The results are shown in a "Specific Surface Area after Pulverization" column of "Physical Properties after Heat Treatment at 1100° C. for 3 hours" in Table 1. The "Specific Surface Area after Pulverization" of "Physical Properties after Heat Treatment at 1100° C. for 3 Hours" in Table 1 corresponds to "Specific Surface Area B" in the present specification.

[Calculation of Specific Surface Area Maintenance Rate]

From the above measurement results, the specific surface area maintenance rate represented by the following formula 1 was calculated. The results are shown in Table 1.

(specific surface area maintenance rate)=[(specific surface area $B$)/(specific surface area $A$)]×100 (%)   <Formula 1>

TABLE 1

| | | Example 1 | Example 2 | Example 3 | Example 4 | Example 5 | Example 6 |
|---|---|---|---|---|---|---|---|
| Composition | $ZrO_2$ (%) | 60 | 60 | 65 | 50 | 40 | 90 |
| | $CeO_2$ (%) | 30 | 30 | 20 | 40 | 55 | 7 |
| | $La_2O_3$ (%) | 5 | 5 | 5 | 5 | 5 | |
| | $Nd_2O_3$ (%) | 5 | 5 | | | | |
| | $Pr_6O_{11}$ (%) | | | | 5 | | |
| | $Y_2O_3$ (%) | | | 10 | | | |
| | $SiO_2$ (%) | | | | | | 3 |
| | $Fe_2O_3$ (%) | | | | | | |
| | NiO (%) | | | | | | |
| Crystal phases | Monoclinic crystal ratio (%) | 0 | 0 | 0 | 0 | 0 | 5 |
| | Tetragonal crystal ratio (%) | 45 | 44 | 0 | 0 | 0 | 95 |
| | Cubic crystal ratio (%) | 55 | 56 | 100 | 100 | 100 | 0 |
| | Pyrochloro or κ phase | Absence | Absence | Absence | Absence | absence | Absence |
| Before heat treatment | Total pore volume (ml/g) | 1.50 | 1.60 | 1.70 | 1.50 | 1.20 | 2.00 |
| | 20 to 100 nm (ml/g) | 0.08 | 0.05 | 0.01 | 0.06 | 0.02 | 0.10 |
| | 100 to 1000 nm (ml/g) | 0.73 | 0.76 | 0.80 | 0.65 | 0.58 | 0.95 |
| | Specific surface area before pulverization (m²/g) | 68.9 | 61.5 | 69.5 | 82.9 | 55.7 | 72.1 |
| | Specific surface area after pulverization (m²/g) | 61.8 | 58.7 | 64.3 | 79.8 | 50.1 | 65.8 |
| | Particle size $D_{50}$ (μ/m) | 3.3 | 1.9 | 2.1 | 2.1 | 2.0 | 2.7 |
| | Particle size after pulverization $D_{50}$ (μ/m) | 1.0 | 1.0 | 0.9 | 0.9 | 1.0 | 0.9 |
| Physical properties after heat treatment at 1000° C. for 3 hours | Specific surface area (m²/g) | 39.8 | 35.6 | 38.1 | 33.6 | 23.9 | 42.3 |
| Physical properties after heat treatment at 1100° C. for 3 hours | Total pore volume (ml/g) | 0.74 | 0.80 | 0.91 | 1.05 | 0.60 | 1.30 |
| | 20 to 100 nm (ml/g) | 0.01 | 0.01 | 0.02 | 0.02 | 0.01 | 0.08 |
| | 100 to 1000 nm (ml/g) | 0.45 | 0.58 | 0.56 | 0.57 | 0.35 | 0.53 |
| | Specific surface area before pulverization (m²/g) | 15.0 | 10.8 | 16.5 | 9.6 | 8.5 | 12.3 |
| | Specific surface area after pulverization (m²/g) | 13.5 | 10.7 | 15.3 | 9.3 | 8.0 | 11.6 |
| | Specific surface area maintenance rate before and after pulverization | 90 | 99 | 93 | 97 | 94 | 94 |

| | | Example 7 | Example 8 | Comparative Example 1 | Comparative Example 2 | Comparative Example 3 |
|---|---|---|---|---|---|---|
| Composition | $ZrO_2$ (%) | 59.9 | 55 | 60 | 65 | 44 |
| | $CeO_2$ (%) | 30 | 30 | 30 | 20 | 56 |
| | $La_2O_3$ (%) | 5 | 5 | 5 | 5 | |

TABLE 1-continued

|  |  | | | | | |
|---|---|---|---|---|---|---|
| | Nd$_2$O$_3$ (%) | 5 | 5 | 5 | | |
| | Pr$_6$O$_{11}$ (%) | | | | | |
| | Y$_2$O$_3$ (%) | | | | 10 | |
| | SiO$_2$ (%) | | | | | |
| | Fe$_2$O$_3$ (%) | 0.1 | | | | |
| | NiO (%) | | 5 | | | |
| Crystal phases | Monoclinic crystal ratio (%) | 0 | 0 | 0 | 0 | 0 |
| | Tetragonal crystal ratio (%) | 45 | 41 | 44 | 0 | 0 |
| | Cubic crystal ratio (%) | 55 | 59 | 56 | 100 | 100 |
| | Pyrochloro or κ phase | Absence | Absence | Absence | Absence | Presence |
| Before heat treatment | Total pore volume (ml/g) | 1.80 | 1.80 | 1.60 | 1.60 | 0.81 |
| | 20 to 100 nm (ml/g) | 0.02 | 0.03 | 0.45 | 0.50 | 0.01 |
| | 100 to 1000 nm (ml/g) | 0.81 | 0.83 | 0.39 | 0.30 | 0.45 |
| | Specific surface area before pulverization (m$^2$/g) | 69.2 | 69.2 | 75.1 | 75.1 | 12.8 |
| | Specific surface area after pulverization (m$^2$/g) | 65.6 | 65.6 | 66.7 | 66.7 | 12.0 |
| | Particle size D$_{50}$ (μ/m) | 2.5 | 2.3 | 7.9 | 18 | 2.1 |
| | Particle size after pulverization D$_{50}$ (μ/m) | 1.0 | 1.0 | 1.0 | 1.0 | 0.9 |
| Physical properties after heat treatment at 1000° C. for 3 hours | Specific surface area (m$^2$/g) | 34.2 | 31.2 | 52.3 | 57.7 | 11.0 |
| Physical properties after heat treatment at 1100° C. for 3 hours | Total pore volume (ml/g) | 0.65 | 0.78 | 0.67 | 0.74 | 0.61 |
| | 20 to 100 nm (ml/g) | 0.01 | 0.01 | 0.19 | 0.25 | 0.01 |
| | 100 to 1000 nm (ml/g) | 0.32 | 0.41 | 0.13 | 0.07 | 0.42 |
| | Specific surface area before pulverization | 9.5 | 8.8 | 23.9 | 28.6 | 9.5 |
| | Specific surface area after pulverization (m$^2$/g) | 9.0 | 8.5 | 15.0 | 18.9 | 9.1 |
| | Specific surface area maintenance rate before and after pulverization | 95 | 97 | 63 | 66 | 96 |

The invention claimed is:

1. A zirconia-based porous body having a total pore volume of 1.0 ml/g or more in a pore distribution based on a mercury intrusion method, wherein
a pore volume of pores having a diameter of 20 nm or more and less than 100 nm is 0.3 ml/g or less, and
a pore volume of pores having a diameter of 100 nm or more and 1000 nm or less is 0.5 ml/g or more.

2. The zirconia-based porous body according to claim 1, wherein the zirconia-based porous body contains one or more crystal phases selected from the group consisting of a monoclinic crystal phase (1), a tetragonal crystal phase (2), and a cubic crystal phase other than a pyrochlore phase and a κ phase (3).

3. The zirconia-based porous body according to claim 1, wherein
the total pore volume is 1.2 ml/g or more, and
the pore volume of the pores having a diameter of 100 nm or more and 1000 nm or less is 0.7 ml/g or more.

4. The zirconia-based porous body according to claim 1, wherein
the total pore volume is 3.0 ml/g or less, and
the pore volume of the pores having a diameter of 100 nm or more and 1000 nm or less is 1.7 ml/g or less.

5. The zirconia-based porous body according to claim 1, wherein
the zirconia-based porous body has a total pore volume of 0.3 ml/g or more in a pore distribution based on a mercury intrusion method after a heat treatment at 1100° C. for 3 hours,
a pore volume of pores having a diameter of 20 nm or more and less than 100 nm is 0.1 ml/g or less after a heat treatment at 1100° C. for 3 hours, and
a pore volume of pores having a diameter of 100 nm or more and 1000 nm or less is 0.2 ml/g or more after a heat treatment at 1100° C. for 3 hours.

6. The zirconia-based porous body according to claim 5, wherein
the total pore volume after the heat treatment at 1100° C. for 3 hours is 2.0 ml/g or less, and
the pore volume of the pores having a diameter of 100 nm or more and 1000 nm or less after the heat treatment at 1100° C. for 3 hours is 1.6 ml/g or less.

7. The zirconia-based porous body according to claim 1, wherein the zirconia-based porous body has a specific surface area of 30 m$^2$/g or more and 150 m$^2$/g or less.

8. The zirconia-based porous body according to claim 7, wherein the zirconia-based porous body has a specific surface area of 40 m$^2$/g or more and 140 m$^2$/g or less.

9. The zirconia-based porous body according to claim 1, wherein the zirconia-based porous body has a specific surface area of 20 m$^2$/g or more after a heat treatment at 1000° C. for 3 hours.

10. The zirconia-based porous body according to claim 9, wherein the zirconia-based porous body has a specific surface area of 100 m$^2$/g or less after the heat treatment at 1000° C. for 3 hours.

11. The zirconia-based porous body according to claim 1, wherein when a specific surface area after a heat treatment at 1100° C. for 3 hours is taken as A, and a specific surface area after 100 g of the zirconia-based porous body is dispersed in 250 g of ion-exchanged water, and a pH of the dispersed product is adjusted to 4.0 with nitric acid, followed by wet-pulverizing under the following wet pulverization conditions until a particle size D$_{50}$ becomes 1 μm or less, drying, and performing a heat treatment at 1100° C. for 3 hours is taken as B, a specific surface area maintenance rate represented by the following formula 1 is 80% or more:

<wet pulverization conditions>
pulverizer: planetary ball mill
ZrO$_2$ pot: 500 cc
ZrO$_2$ beads (φ 2 mm): 900 g
number of rotations: 400 rpm (specific surface area maintenance rate)=[(specific surface area $B$)/(specific surface area $A$)]×100 (%)  <Formula 1>.

12. The zirconia-based porous body according to claim 1, wherein the zirconia-based porous body contains 1 mass % or more and 60 mass % or less of one or more oxides selected from rare earth elements.

13. The zirconia-based porous body according to claim 12, wherein the zirconia-based porous body contains 1 mass % or more and 50 mass % or less of the one or more oxides selected from rare earth elements.

14. The zirconia-based porous body according to claim 1, wherein the zirconia-based porous body contains 1 mass % or more and 60 mass % or less of one or more oxides selected from the group consisting of lanthanum oxide, cerium oxide, neodymium oxide, praseodymium oxide, and yttrium oxide.

15. The zirconia-based porous body according to claim 1, wherein the zirconia-based porous body contains 0.1 mass % or more and 30 mass % or less of one or more oxides selected from the group consisting of transition metal elements other than rare earth elements, aluminum, and silicon.

* * * * *